United States Patent [19]

Calcagno

[11] 3,969,587
[45] July 13, 1976

[54] SELECTIVE TRANSMISSION OF PRERECORDED VOICE SIGNALS TO SUBSCRIBERS OF TIME-SHARING TELECOMMUNICATION SYSTEM

[75] Inventor: Piero Calcagno, Turin, Italy

[73] Assignee: CSELT - Centro Studi e Laboratori Telecomunicazioni SpA, Turin, Italy

[22] Filed: July 14, 1975

[21] Appl. No.: 595,430

[30] Foreign Application Priority Data
July 12, 1974 Italy ............................. 69218/74

[52] U.S. Cl. ............................ 179/15 AT; 179/7 R
[51] Int. Cl.$^2$ .................... H04J 6/00; H04M 15/10
[58] Field of Search ......... 179/15 AT, 15 A, 15 AP, 179/15 BS, 15 AL, 15 BA, 7 R, 7.1 R, 8 R, 7 MM, 18 J

[56] References Cited
UNITED STATES PATENTS

| | | | |
|---|---|---|---|
| 3,403,383 | 9/1968 | Kienzle et al. .............. | 179/15 AT X |
| 3,514,540 | 5/1970 | Widdel .......................... | 179/7 R |
| 3,524,946 | 8/1970 | Pinet et al. ................. | 179/15 AT X |
| 3,614,328 | 10/1971 | McNaughton et al. ......... | 179/15 AT |
| 3,851,102 | 11/1974 | Bauernfeind et al. ........... | 179/7 R X |

Primary Examiner—Thomas A. Robinson
Attorney, Agent, or Firm—Karl F. Ross; Herbert Dubno

[57] ABSTRACT

A dynamic memory UR containing $n$ different message words, carried on as many endless signal tracks, works into a set of $m$ temporal voice channels through a TDM switching matrix RC enabling any channel to be periodically connected, in its recurrent time slot, to a selected signal track. Messages synthesized from up to $k$ words may provide information on the charge of a toll call, for example, as determined in a processor of a central office, the processor translating that information into data codes identifying corresponding signal tracks in response to a request from an inquiring subscriber. A first static memory $M_1$, with $m$ stages individually allocated to the several PCM channels, thereupon receives the data codes in respective sections of the stage associated with the inquiring subscriber and emits a start signal in the corresponding time slot informing a logic network LC of the presence of data stored therein, the logic network then monitoring selected outputs of the dynamic memory UR for the appearance of synchronizing signals prefacing their prerecorded message words. Coincidence of the first synchronizing signal with the start signal triggers the logic network LC into a sequence of operations in which a second static memory $M_2$, connected in a loop circuit with that network, receives and re-emits bit combinations of progressively increasing numerical value identifying successive words of a message to be read out from the selected signal tracks to the inquiring subscriber. The readout of the message, ending after $k$ words or upon the appearance of a terminal code from the processor entered in one or more sections of the allocated stage of memory $M_1$, may be repeated at least once. A counter CO responsive to the start signal arrests the dynamic memory UR whenever no such signal appears within a scanning cycle of $m$ time slots.

10 Claims, 5 Drawing Figures

| | | IN | | | | OUT | | | | | | |
|---|---|---|---|---|---|---|---|---|---|---|---|---|
| | 26 | 22 | 24 | 31 | 30 | 32 | 35 | 37 | 34 | 29 | 33' | |
| 00 | 0 | 1 | — | 1 | — | 0 | 1 | 0 | 0 | 0 | 01 | 1 |
| | | 0 | — | 0 | — | 0 | 1 | 0 | 0 | 0 | 00 | 0 |
| 01 | 1 | — | — | 0 | — | 0 | 1 | 0 | 0 | 1 | 10 | 1 |
| | | — | — | 1 | — | 0 | 1 | 0 | 0 | 0 | 01 | 1 |
| 10 | 1 | — | — | 1 | — | 1 | 1 | 0 | 0 | 1 | 00 | 2 |
| | | — | — | 0 | — | 0 | 1 | 0 | 0 | 0 | 10 | 1 |
| 00 | 2 | — | 0 | — | 1 | 0 | 0 | 0 | 1 | 0 | 00 | 0 |
| | | — | 1 | — | 1 | 1 | 0 | 1 | 0 | 1 | 00 | 0 |
| | | — | — | 1 | 0 | 0 | 1 | 0 | 0 | 0 | 01 | 2 |
| | | — | — | 0 | 0 | 0 | 1 | 0 | 0 | 0 | 00 | 2 |
| 01 | 2 | — | — | 0 | — | 0 | 1 | 0 | 0 | 1 | 10 | 2 |
| | | — | — | 1 | — | 0 | 1 | 0 | 0 | 0 | 01 | 2 |
| 10 | 2 | — | — | 1 | — | 1 | 1 | 0 | 0 | 1 | 00 | 3 |
| | | — | — | 0 | — | 0 | 1 | 0 | 0 | 0 | 10 | 2 |
| 00 | k | — | 0 | — | 1 | 0 | 0 | 0 | 1 | 0 | 00 | 0 |
| | | — | 1 | — | 1 | 1 | 0 | 1 | 0 | 1 | 00 | 0 |
| | | — | — | 1 | 0 | 0 | 1 | 0 | 0 | 0 | 01 | K |
| | | — | — | 0 | 0 | 0 | 1 | 0 | 0 | 0 | 00 | K |
| 01 | k | — | — | 0 | — | 0 | 1 | 0 | 0 | 1 | 10 | K |
| | | — | — | 1 | — | 0 | 1 | 0 | 0 | 0 | 01 | K |
| 10 | k | — | — | 1 | — | 1 | 1 | 0 | 0 | 1 | 00 | 1 |
| | | — | — | 0 | — | 0 | 1 | 0 | 0 | 0 | 10 | K |
| 00 | 1 | — | 0 | — | — | 0 | 0 | 0 | 1 | 0 | 00 | 0 |
| | | — | 1 | — | — | 1 | 0 | 1 | 0 | 1 | 00 | 0 |

Grouping: rows 1–6 = 1st WORD; rows 7–14 = 2nd WORD; rows 15–22 = k<sup>th</sup> WORD; rows 23–24 = RESET.

Fig. 4

SELECTIVE TRANSMISSION OF PRERECORDED VOICE SIGNALS TO SUBSCRIBERS OF TIME-SHARING TELECOMMUNICATION SYSTEM

FIELD OF THE INVENTION

My present invention relates to a time-sharing telecommunication system, more particularly a telephone system of the time-division-multiplex (TDM) type, wherein up to $m$ subscriber stations communicate with a central office via respective temporal voice channels over which voltage samples are periodically transmitted — preferably in pulse-code-modulated (PCM) form — in respective time slots forming part of a recurrent scanning cycle or frame.

BACKGROUND OF THE INVENTION

It is known to provide in such a central office a processor which, besides facilitating the establishment of a connection between subscribers in response to selection signals such as trains of dial pulses, monitors the evolution of that connection and registers certain information pertaining thereto, especially the duration and/or the charge therefor in the case of a toll call. That information, however, is generally fed into a centralized computer and is not readily available to a calling (or called) subscriber, except by means of complicated and therefore expensive data-transmission equipment not invariably included in such systems.

OBJECT OF THE INVENTION

It is, therefore, the object of my present invention to provide automatic means in a TDM telecommunication system, accessible to all the subscriber stations thereof, for furnishing relevant call information in real time and in audible form with the aid of relatively simple circuitry in response to selection signals from inquiring subscribers.

SUMMARY OF THE INVENTION

I realize this object, pursuant to my present invention, by the provision at a central office, equipped with a conventional processor as described above, of a dynamic memory provided with $n$ endless signal tracks containing respective prerecorded, e.g. electromagnetically inscribed, message words which are audibly reproducible and represent different types of call information available from the processor, such as the charge for a toll call registered on a meter assigned to a subscriber station. Each message word is prefaced on its track by a synchronizing signal which can be separated from the message word, e.g. by a filter or frequency discriminator, the message words being emitted on a set of $n$ first outputs whereas the corresponding synchronizing signals present themselves on a set of $n$ second outputs. Two static memories at the central office constitute first and second storage means each having $m$ stages respectively allocated to the $m$ voice channels, each of the $m$ stages of the first storage means (hereinafter referred to as principal memory stages) being loadable with one or more data codes from the processor by asynchronously operative circuitry; the data code or codes thus stored identify respective signal tracks carrying relevant call information elicited by a selection signal from an inquiring subscriber. A periodic readout of these data codes in recurrent time slots, assigned to the channel serving the inquiring subscriber, takes place under the control of a time base with the aid of synchronously operative circuitry selectively connectable to any of the second outputs of the dynamic memory; this readout is initiated by the occurrence of a synchronizing signal on a signal track identified by the registered data code. The $m$ stages of the second storage means (hereinafter referred to as ancillary memory stages) serve to monitor the activities of the corresponding primary memory stages for the purpose of continuity and to terminate the readout of data codes therefrom after a period sufficient to transmit the entire prerecorded message word of any selected track to the inquiring subscriber via switch means periodically connecting that tract to the appropriate channel. Termination of the readout may occur after the extraction of $k$ data words from a given primary memory stage, identifying as many signal tracks of the dynamic memory, or earlier in response to a special bit combination inserted by the processor in a section of the primary memory stage here considered. The entire message, of $k$ words or less, may be repeated at least once before a clearing signal is given to unload that memory stage.

Advantageously, according to a more particular feature of my invention, the synchronously operative circuitry includes a logic network connected in a closed loop with the second storage means and designed to modify the contents of the stages thereof in response to a recurrence of the synchronizing signal picked up from a selected dynamic-memory output. A repetition controller, serving to insure the iterative readout of the contents of a loaded primary memory stage, may be inserted in a branch of that loop.

The dynamic memory need not be operated when there is no inquiry from a subscriber requiring its intervention. I therefore prefer to provide this memory with a driving circuit including a counter connected to the first storage means for ascertaining the presence of a data code in at least one of the $m$ primary stages thereof during a scanning cycle, the counter deactivating the dynamic memory in the absence of such data codes.

BRIEF DESCRIPTION OF THE DRAWING

The above and other features of my invention will now be described in detail with reference to the accompanying drawing in which:

FIG. 4 is a table showing the input and output signals of a logic network forming part of that control unit; and FIG. 5 is a truth table for a repetition controller included in that unit.

SPECIFIC DESCRIPTION

Figure 1:
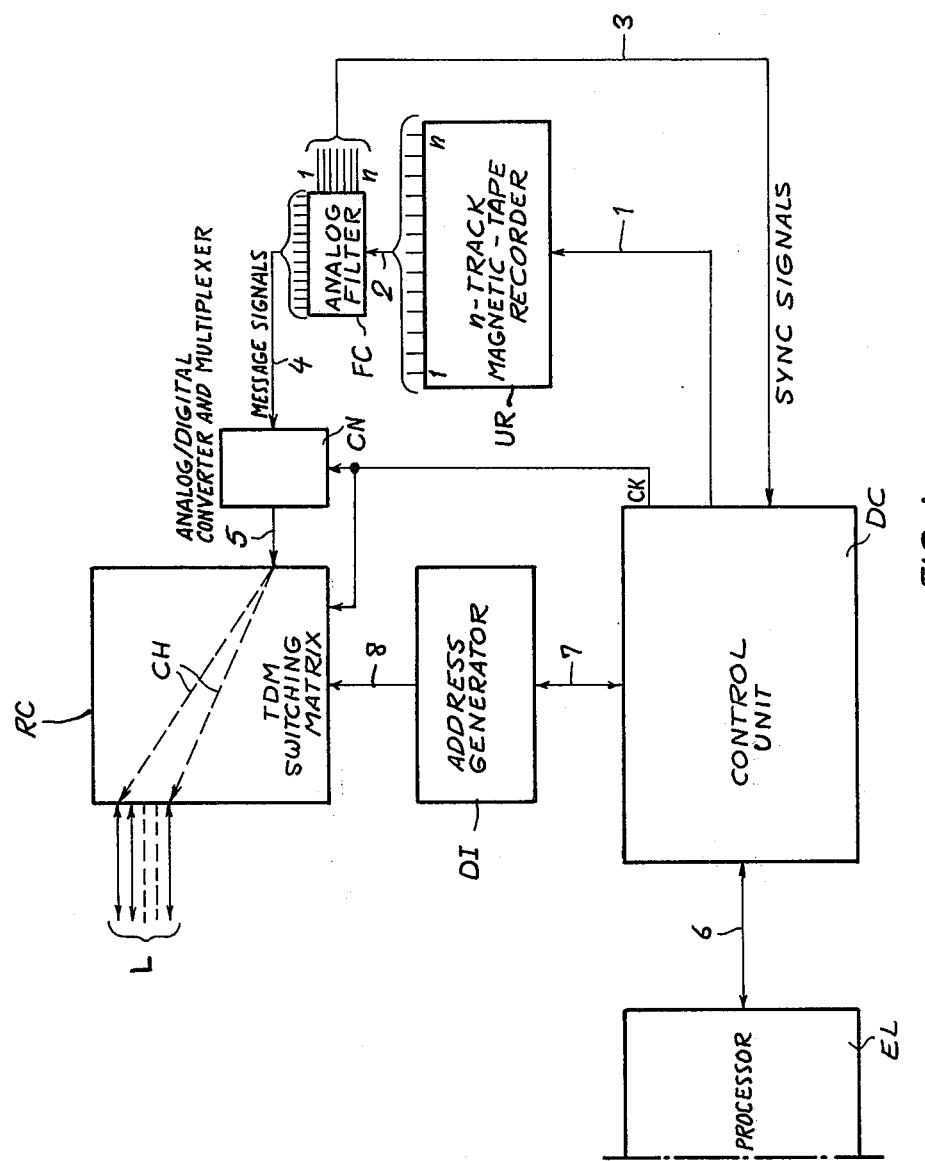
FIG. 1 is a block diagram of part of a central office of a PCM/TDM telephone system provided with an automatic voice-signal generator according to the invention.

In FIG. 1 I have shown part of a central office or exchange of a telephone system serving a multiplicity of subscriber lines L adapted to intercommunicate, in the well-known manner, via a group of $m$ temporal voice channels on a time-sharing basis. A conventional processor EL supervises the establishment of connections among these lines L as well as between them and remote exchanges not shown, with metering of toll calls to compute the charges to the calling or occasionally the called subscribers.

In accordance with my present invention, the voice channels have outgoing branches — diagrammatically indicated at CH — passing through a switching matrix RC of the time-division-multiplex (TDM) type. A magnetic-tape recorder UR with $n$ parallel, endless tracks, serving as a dynamic memory, is connected to matrix RC via an $n$-conductor multiple 2, a set of analog filters FC, an extension 4 of multiple 2, an analog/digital converter and multiplexer CN including the usual sampling and holding as well as quantizing circuits for translating voltage samples into PCM pulse combinations, and a link 5. Units CN and RC are controlled by clock signals CK from a time base BT (FIG. 2) in a control unit DC more fully described hereinafter; these clock signals consist of bit combinations of progressively changing numerical values successively identifying the $m$ channels CH, and therefore the associated subscriber lines L, in the course of a recurrent scanning cycle or frame. Thus, each temporal channel consists of a succession of sampling intervals or time slots, of duration $T_c$ (see FIG. 4), as is well known per se. By timing the timingthe connections between link 5 and lines L, switching matrix RC can effectively extend any of the analog outputs 2 of recorder UR to any voice channel CH and hence to any line L.

Filters FC are designed to separate audibly reproducible message signals in outputs 2 from accompanying synchronizing signals of characteristic frequencies outside the audio range, these synchronizing signals appearing on another $n$-conductor output multiple 3 extending to control unit DC. The latter, communicating with processor EL via a multiple 6, controls the drive of tape recorder UR via a lead 1 and also exchanges information by way of a multiple 7 with an address generator DI which periodically sets the switching matrix DC via a further multiple 8. Address generator DI has a bit capacity sufficient to correlate, simultaneously, any of the $m$ channels CH with any of the $n$ signal tracks of recorder UR.

If a subscriber served by a line L wishes to obtain spoken information relevant to a call already completed or about to be made, e.g. regarding toll charges, he dials a corresponding selection code to activate the processor EL. The latter thereupon transmits to control unit DC one or more data codes identifying the track or tracks on which the requisite information is contained within recorder UR. Unit DC, after starting the recorder if it is not already in operation, reads the data code or codes out to address generator DI in the time slots of the temporal channel assigned to the inquiring subscriber, along with a subscriber-identifying code, at times determined by the arrival of synchronizing signals from the selected tracks over multiple 3. Switching matrix RC thereupon connects the assigned channel to each of these tracks for a period sufficient to enable the transmission of the stored words thereof to the inquiring subscriber.

Each word may be recorded one or more times on its track, every occurrence thereof being preceded by the associated synchronizing signal. These signals, therefore, indicate to unit DC the correct instants for starting transmission from any track and for changing over to the next track in sending out a composite message of several words. The pulse-coded message reaching a subscriber line L is, of course, reconverted into audio waves in the same way as are the PCM samples from communicating subscribers whereby the inquiring subscriber receives his answer in spoken form.

Figure 2:
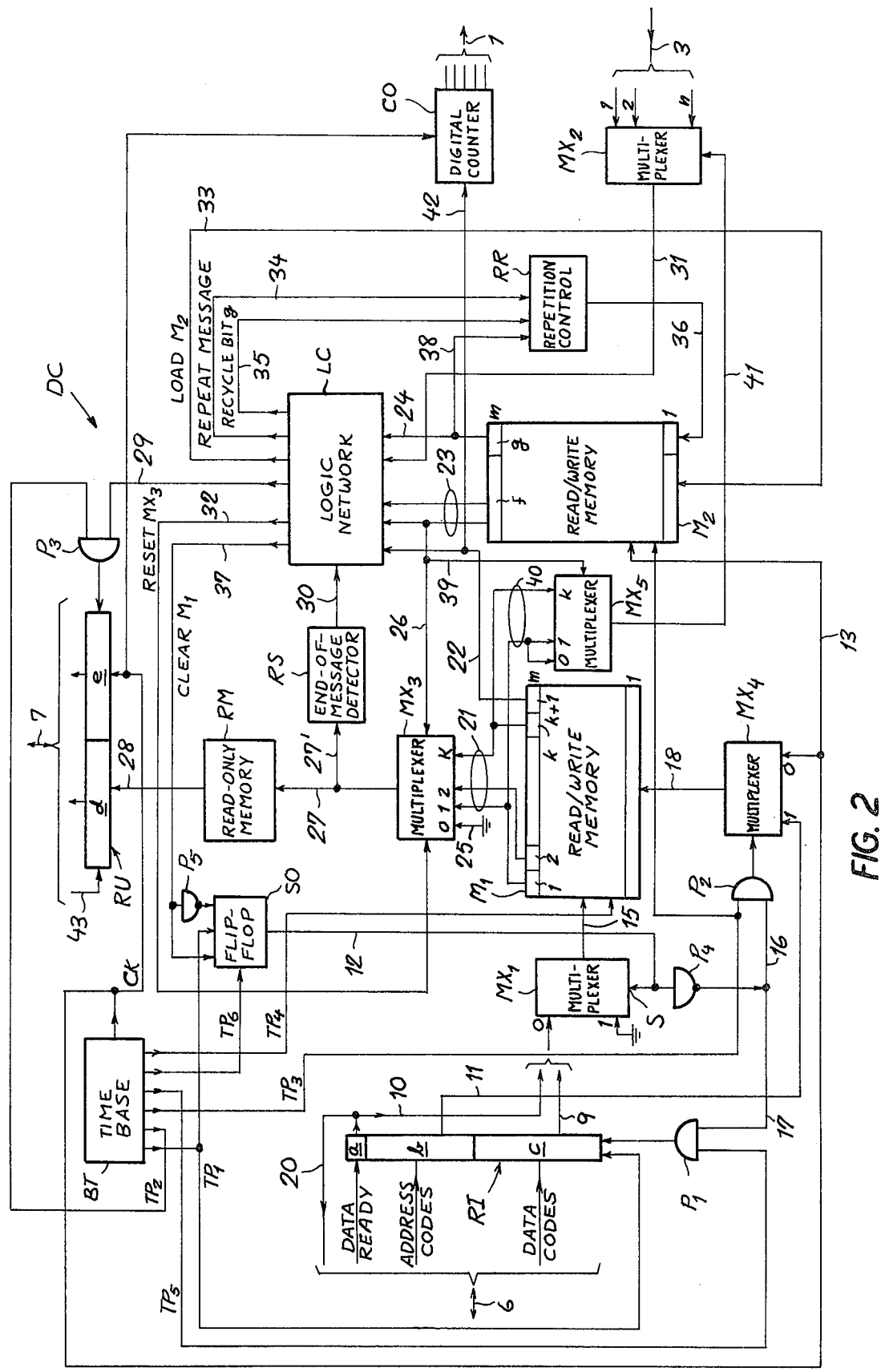
FIG. 2 is a more detailed circuit diagram of a control unit for the voice-signal generator of FIG. 1.

FIG. 2 shows details of control unit DC which includes, besides the aforementioned time base BT, an input register RI linked via multiple 6 with processor EL, an output register RU connected by way of multiple 7 with address generator DI, a digital counter CO working into lead 1, and a multiplexer $MX_2$ with $n$ inputs connected to output multiple 3 of filter FC. The unit further comprises a first read/write memory $M_1$, with $n$ principal stages each subdivided into $(k+1)$ sections, a second read/write memory $M_2$ having $m$ ancillary stages, a logic network LC connected in a closed loop circuit with memory $M_2$, a repetition controller RR in a branch of that loop circuit, further multiplexers $MX_1$, $MX_3$, $MX_4$, $MX_5$, a binary store constituted by a data flip-flop SO, a read-only memory RM in parallel with an end-of-message detector RS, AND gates $P_1$, $P_2$, $P_3$, and inverters $P_4$, $P_5$.

Figure 3:
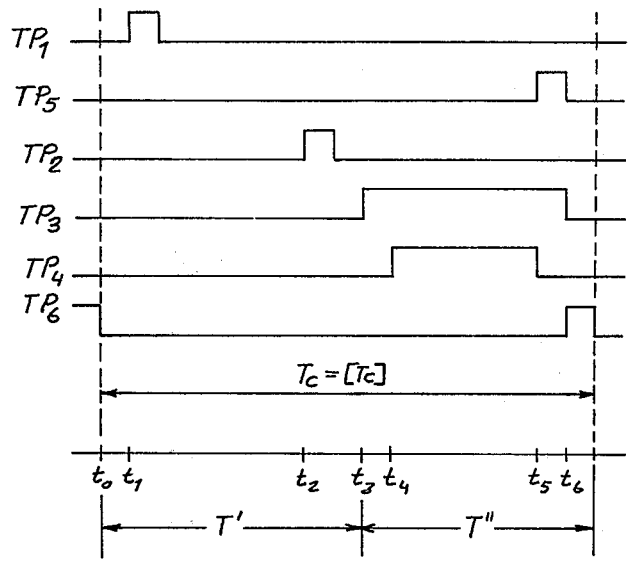
FIG. 3 is a set of graphs relating to the operation of a time base included in the control unit of FIG. 2.

Time base BT has an output carrying the clock signals CK and six further outputs on which respective timing pulses $TP_1$, $TP_2$, $TP_3$, $TP_4$, $TP_5$, $TP_6$ appear at instants $t_1 - t_6$ in the course of a time slot $T_c$ as illustrated in FIG. 3.

Input register RI, serving as a buffer memory, is divided into three sections $a$, $b$, and $c$ respectively receiving from processor EL a "data ready" bit, an address code identifying an inquiring subscriber, and a series of data codes representing respective tracks of recorder UR (FIG. 1) on which the words of a composite reply message are to be found. Such a message may consist of up to $k$ words; if it is to be shorter, the information entered in section $c$ of register RI also includes a special (e.g. all-zero) code in the bit positions reserved for the unused data codes. The contents of register sections $a$ and $c$ are delivered over a lead 10 and a multiple 9 to a group of inputs "0" of multiplexer $MX_1$ for transfer to a stage (i.e. a horizontal row) of memory $M_1$ selected by the address in register section $b$ which is delivered via a multiple 11 to a group of inputs "1" of multiplexer $MX_4$, this loading of memory $M_1$ occurring via multiples 15 and 18 in the presence of timing pulse $TP_4$. Multiplexer $MX_1$ also has a group of permanently grounded alternate inputs "1" whereas multiplexer $MX_4$ has alternate inputs "0" connected via a multiple 13 to time base BT for energization by the progressively varying clock signal CK. The loading operation thus takes place at a well-defined instant within a time slot but independently of the track positions of recorder UR as defined by its synchronizing signals wherefore the circuit elements involved in this transfer, i.e. register RI, multiplexer $MX_1$, and the left-hand half of multiplexer $MX_4$, may be described as asynchronously operative. In contradistinction thereto, and as more fully explained hereinafter, the readout of the stored data codes from sections $1 - k$ of a given stage of memory $M_1$ — and of an accompanying data-ready bit entered in section $(k+1)$ thereof — occurs in timed relationship with the track movement under the control of logic network LC, memory $M_2$ and multiplexer $MX_3$ as well as the right-hand half of multiplexer $MX_4$, these circuit elements being therefore describable as synchronously operative. Multiplexer $MX_3$, switchable by signals on a multiconductor branch 26 of an output multiple 23 of memory $M_2$ and resettable by an overriding signal on an output lead 32 of logic network LC, has input groups labeled "0", "1", "2" . . . "$k$", input group "0" being permanently grounded at 25 whereas the other input groups are connected to the correspondingly designated sections of the several memory stages through respective wire multiples collectively designated 21. Section ($k+1$) of each stage works into logic network LC through a lead 22. With multiplexer $MX_4$ in its "0" position, the readout of any stage occurs whenever that stage is individually addressed by a corresponding clock signal CK. That readout, however, is effective only in regard to a stage section to which the multiplexer $MX_3$ has been shifted by a signal on multiple 26.

A data code thus read out through multiplexer $MX_3$ is delivered on an output multiple 27 thereof read-only memory RM from which it extracts the address of a corresponding signal track of recorder UR, that address being then introduced through a multiple 28 into a section $d$ of register RU whose other section $e$ simultaneously receives the corresponding clock signal CK identifying the channel being scanned. A branch 27' of multiple 27 extends to detector RS which, if the extracted code happens to be of the all-zero type, sends an end-of-message signal over a lead 30 to logic network LC.

A branch 42 of lead 22 extends to counter CO which has a numerical capacity $m$ and is stepped by the clock signal CK to register the occurrence of a bit in any section ($k+1$) of the $m$ stages of memory $M_1$ during a scanning cycle. If no such bit is detected, counter CO d-energizes its output lead 1 to stop the drive of recorder UR in FIG. 1.

The stages of memory $M_2$ are divided into a main part $f$ and a supplemental part $g$, the latter carrying a bit which distinguishes between an original and a repeated readout and which is recirculated through logic network LC by way of leads 24 and 34, repetition controller RP and another lead 36. Multiple 23 originates at the main part $f$ of each memory stage which is also individually addressable by clock signal CK. The loading of any stage so addressed, from logic network LC by way of a multiple 33, takes place in the presence of timing pulse $TP_3$ and results in the immediate appearance of the contents of that memory stage on leads 23 and 24.

Another branch 39 of multiple 23 serves to switch the multiplexer $MX_5$ concurrently with multiplexer $MX_3$, multiplexer $MX_5$ have input groups labeled "0", "1"..."$k$". Input group "1" of multiplexer $MX_3$ is tied to input groups "0" and "1" of multiplexer $MX_5$; input groups "2" to "$k$" of multiplexers $MX_3$ and $MX_5$ are similarly interconnected by extensions 40 of leads 21. An output multiple 41 of multiplexer $MX_5$ terminates at switching inputs of multiplexer $MX_2$ in order to connect an output lead 31 of the latter to a selected conductor in output multiple 3 of filter FC (FIG. 1). Lead 31 constitutes one of the inputs of logic network LC. This network also has further outputs in the form of a lead 35 indicating by its energization that the bit stored in part $g$ of any ancillary memory stage is to be recycled, a lead 29 extending to one input of AND gate $P_3$ whose other input receives the timing pulse $TP_2$, and a lead 37 connected directly to one data input and via inverter $P_5$ to the other data input of flip-flop SO. That flip-flop is triggerable by timing pulse $TP_1$, to emit on an output lead 12 a binary voltage of the same logical value as that appearing on lead 37, and is resettable by timing pulse $TP_6$ to de-energize the lead 12. The latter lead, extending to a switching input S of multiplexer $MX_1$, determines by its state of energization whether that multiplexer connects its output multiple 15 to input group "0" or "1"; since lead 12 normally carries zero voltage, as will be apparent hereinafter, a switchover to the grounded inputs "1" of multiplexer $MX_1$ occurs only under certain circumstances.

An extension 14 of lead 12 passes through inverter $P_4$ and has branches 16, 17 terminating at respective inputs of AND gates $P_2$ and $P_1$, the former also receiving the timing pulse $TP_2$ whereas the latter is energizable by timing pulse $TP_5$. Gate $P_2$, when conducting, switches the multiplexer $MX_4$ from position "0" to position "1" so as to connect output multiple 18 via conductors 11 to section $b$ of input register RI, disconnecting that multiple from leads 13 which carry the clock signal CK. Register RI can be loaded at the beginning of a time slot under the control of pulse $TP_1$; its discharge upon energization of an output lead 19 of gate $P_1$ transmits to the processor EL a confirmation signal on a branch 20 of lead 10, causing that processor to disconnect itself from register RI until another subscriber requires the service of control unit DC. Processor EL may also intervene in an ongoing answer-back operation, if the inquiring subscriber hangs up prematurely, by introducing an all-zero code into register section $c$ for transfer to the corresponding stage of memory $M_1$.

The passage of timing pulse $TP_2$ through gate $P_3$, in the energized state of lead 29, discharges the contents of output register RU into address generator DI of FIG. 1. Multiple 7, linking components RU and DI with each other, also includes a lead 43 for clearing the register RU in response to a confirmation signal from address generator DI. Evidently, the loading of the address generator with the contents of register sections $d$ and 3 must be accomplished within a fraction of the duration $T_c$ of a time slot beginning at instant $t_2$ (see FIG. 3). It will also be apparent that a first period $T'$ of each time slot, extending between instants $t_0$ and $t_3$, is reserved for the reading of memory $M_1$ whereas a second period $T''$, between instants $t_3$ and $t_0$, is available for writing in that memory and for updating the contents of memory $M_2$.

The asynchronous phase of operation of control unit DC proceeds in response to pulses TP, $TP_3 - TP_6$ in any time slot $T_c$ in which the processor EL happens to respond to a selection signal from an inquiring subscriber; the synchronous phase of operation utilizes timing pulses $TP_2$ and $TP_3$ in a similar but not necessarily homologous time slot [$T_c$], both types of time slot being represented by the diagram of FIG. 3.

I shall first describe the asynchronous phase, starting with the entry of a "data ready" bit in section $a$ and associated address and data codes in sections $b$ and $c$ of register RI under the control of a timing pulse $TP_1$ appearing at instant $t_1$. The same pulse $TP_1$ tests the condition of lead 37 by triggering the flip-flop SO, it being assumed that a logical "0" is present at this time on both leads 37 and 12. Multiplexer $MX_1$ is thus connected to leads 9 and 10 while AND gates $P_1$ and $P_2$ are unblocked.

The generation of pulse $TP_2$ at time $t_2$ is ineffectual in this phase.

At time $t_3$, pulse $TP_3$ passes the gate $P_2$ and switches the multiplexer $MX_4$ to its inputs "1", this pulse lasting until time $t_6$ so as to coincide with writing pulse $TP_4$ which comes into existence at time $t_4$ and ends at time $t_5$. A stage of memory $M_1$ identified by the subscriber address in register section $b$ thus receives the data codes of section c together with the bit of section a; register RI is then cleared by pulse TP$_5$, passing through gate P$_1$ at time $t_5$, with generation of the aforedescribed confirmation signal on lead 20. At time $t_6$, concurrently with the disappearance of writing pulse TP$_4$, timing pulse TP$_6$ appears in the resetting input of flip-flop SO; this, however, has no effect under the described circumstances inasmuch as output lead 12 is already de-energized.

The presence of a "data ready" bit in section ($k$+1) of the memory stage here considered establishes the synchronous phase for the readout of the data stored in that memory stage. This readout proceeds in conformity with the tables of FIGS. 4 and 5 relating to the mode of operation of logic network LC and repetition controller RP, respectively (the example given provides for a single repetition, i.e. for two consecutive readouts of a given message).

The table of FIG. 4 shows the state of energization of inputs 22 – 24, 30, 31 and outputs 29, 32 – 35, 37 of network LC in successive scanning cycles. All the signals are given in binary form, except for the portion 26 of input multiple 23 and a similar portion 33' of output multiple 33 whose bit combinations have been represented in decimal notation.

Repetition controller RP has three inputs respectively connected to lead 34, lead 35 and an extension 38 of lead 24; the table of FIG. 5 shows the state of energization of its output lead 36 in response to various signal combinations on leads 34, 35 and 38. In the system here described, recycling of the bit of stage $g$ (appearing on leads 24 and 38) is required only while data readout is in progress; thus, a recycle command represented by energization of lead 35 never coincides with a "repeat message" command on lead 34 (given at the end of the original readout) so that leads 34 and 35 cannot be simultaneously energized. This has been indicated in FIG. 5 by diagonal lines in column "1 1" of the truth table of FIG. 5. According to column "0 1" the recycle command on lead 35 reproduces the condition of leads 24 and 38 on lead 36; in the absence of such a command, the signal on lead 36 is either "0" or "1", depending on the energized or de-energized state of lead 34 as shown in columns " 0 0" and "1 0".

In the idle state of the sychronous circuit components, multiple 23 is totally de-energized as represented by signal combination 00/0 in the top line of FIG. 4; the second line from the top indicates that this condition is maintained by the recirculation of the same signal combination via multiple 33 to memory M$_2$ as long as an "0" appears on at least one of the two input leads 22 and 31 (the condition of leads 24 and 30 is immaterial at this time, as indicated by dashes). The contents of memory M$_2$ are periodically updated, for any stage thereof addressed by clock signal CK, under the control of timing pulse TP$_3$. Thus, the state of energization of multiple 26 does not change until a "1" appears on leads 22 and 31 simultaneously, i.e. until a "data ready" bit from a stage of memory M$_1$ coincides with a synchronizing signal from an output lead of filter FC (and therefore of recorder UR) identified by the data code in section 1 of the same principal memory stage as transmitted via multiple inputs "0" of multiplexer MX$_5$ and leads 41 to the switching inputs of multiplexer MX$_2$. Upon such coincidence, as shown in the top line of FIG. 4, the state of multiple 33 changes to 01/1 and results in a corresponding energization of multiple 23, the decimal value "1" on multiple 26 switching the multiplexer MX$_3$ from its grounded inputs "0" to its inputs "1" and producing a similar shift in multiplexer MX$_5$. The contents of section 1 of the principal memory stage here considered, already present on output multiple 41 of multiplexer MX$_5$, now also appear on output multiple 27 of multiplexer MX$_3$ to extract from read-only memory RN the address of the selected track, this being the same from which the synchronizing signal is being passed at that instant to lead 31 by multiplexer MX$_2$. The presence of a bit in section $k_1$ negates, of course, the possibility that the data code in section 1 be of the all-zero or end-of-message type detectable by unit RS.

Line 4 of FIG. 4 indicates that the configuration 01/1 remains in effect as long as the synchronizing signal is present on lead 31. Upon the disappearance of that signal, as shown in line 3 of the table, the signal configuration on multiple 33 changes to 10/1 and results in a corresponding energization of multiple 23 as per lines 5 and 6. That changeover is accompanied by an energization of lead 29 whereby timing pulse TP$_2$ is enabled to read out the contents of register RU into address generator DI.

The condition last described, represented by line 6 of the table of FIG. 4, persists for as many scanning cycles as are required to transmit the prerecorded word on the selected track to the inquiring subscriber, i.e. until the synchronizing signal recurs on that track (line 5). This recurrence now establishes the signal configuration 00/2 on multiple 33 and energizes the lead 32 simultaneously with lead 29, thereby resetting the multiplexer MX$_3$ to its "0" position so that timing pulse TP$_2$ causes the delivery of all-zero "silence" code from register RU to address generator DI. The next updating of pulse TP$_3$ produces the same signal configuration 00/2 on multiple 23 as shown in lines 7 – 10 of FIG. 4.

It is possible that the message to be transmitted to the inquiring subscriber consists of only the one word identified by the data code in section 1 of the memory stage here considered. In that instance, detector RS now responds to an all-zero code in its input multiple 27' to energize the lead 30 as shown in lines 7 and 8 of the table. If the message has been sent only once, lead 24 carries a "0" (line 7) which results in an energization of lead 34 along with a restoration of the initial 00/0 configuration on multiple 33. The preceding steps can now be repeated. If, on the other hand, such repetition has already taken place, the "1" on lead 24 results in the energization of leads 29, 32 and 37 concurrently with a return to the initial state 00/0; this means that, in the next scanning cycle, timing pulse TP$_1$ releases the temporal channel heretofore used for message transmission by energizing the lead 12, thereby switching the multiplexer MX$_1$ to its position "1" and clearing the corresponding stage of memory M$_1$.

In the event that section 2 of the considered memory stage contains a true data code, lead 30 remains de-energized and the configuration 00/2 is maintained (line 10 of FIG. 4) until another synchronizing signal is picked up on lead 31 from the track identified by that data code (see line 9). There now occurs a changeover to configuration 01/2 which, upon the disappearance of the synchronizing signal (lines 12 and 11), changes to 10/2 (line 11) and remains in that condition (lines 13 and 14) until the synchronizing signal recurs to cause a step-up to configuration 00/3 (line 13). In an analogous manner, multiplexers MX$_3$ and MX$_5$ are further switched until they reach position $k$ if no stop signal has been generated by end-of-message detector RS; the evolution of that readout step is analogous to that of step No. 2, as illustrated in the lower half of FIG. 4, except that the recurrence of a synchronizing signal on lead 31 preferential configuration 10/k (fourth line from the bottom) establishes the heretofore unused signal combination 00/1. From there messages system returns to the initial state 00/0, with energization of lead 34 in the case of an original readout (penultimate line) and of leads 29, 32 and 37 after a repeat of the message (bottom line).

It will thus be apparent that the voice-signal generator according to my invention is capable of answering inquiries from any number of subscribers in real time, without internal blockages or preferantial treatment of certain subscribers over others. In an extreme case, all $m$ subscriber lines can receive message simultaneously from the same or different signal tracks of dynamic memory UR, the number $n$ of these tracks being independent of the number $m$ of subscribers.

I claim:

1. In a time-division-multiplex telecommunication system with $m$ temporal voice channels extending between respective subscriber stations and a central office, timing means at said central office for sequentially scanning said channels in a recurrent cycle of $m$ time slots, and a processor at said central office responsive to selection signals from any subscriber station for emitting relevant call information, the combination therewith of:

a dynamic memory provided with $n$ endless signal tracks containing respective prerecorded audibly reproducible message words representing different types of call information available from said processor, each message word being prefaced on its track by a synchronizing signal, said dynamic memory having $n$ first outputs emitting the message words and $n$ second outputs emitting the synchronizing signals of respective tracks;

first storage means provide with $m$ principal memory stages respectively allocated to said $m$ channels;

asynchronously operative circuitry for loading a first memory stage, allocated to a channel serving an inquiring subscriber, with at least one data code received from said processor and identifying a signal track carrying relevant call information;

synchronously operative circuitry controlled by said timing means and selectively connectable to any of said second outputs in response to a registered data code for initiating, upon the occurrence of a corresponding synchronizing signal, a periodic readout in recurrent time slots, assigned to the channel serving the inquiring subscriber, of a data code loaded into a principal memory stage allocated to the same channel;

switch means responsive to said timing means for periodically connecting any one of said channels, during an assigned time slot, through a respective first output of said dynamic memory to a selected signal track thereof identified by a data code read out from a principal memory stage allocated to the respective channel, thereby transmitting the prerecorded message word of the selected signal track to the inquiring subscriber; and second storage means in said synchronously operative circuitry provided with $m$ ancillary memory stages for respectively monitoring the activities of said $m$ principal memory stages and terminating the readout of a data code therefrom after a period sufficient to transmit the entire prerecorded message word of the selected signal track.

2. The combination defined in claim 1 wherein said synchronously operative circuitry further includes a logic network connected in a closed loop with said second storage means for modifying the contents of said ancillary memory stages in response to a recurrence of said synchronizing signal.

3. The combination defined in claim 2 wherein each of said principal memory stages includes $k$ sections for the storage of as many data codes simultaneously received from said processor in response to a selection from an inquiring subscriber, said synchronously operative circuitry comprising multiplexing means controlled by the contents of said ancillary memory stages in response to successive recurrences of said synchronizing signal for sequentially connecting said switch means to different sections of a loaded principal memory stage, said logic network being adapted to introduce a termination code into an ancillary memory stage in response to the recurrence of a synchronizing signal following the readout of data codes from all $k$ sections of the corresponding principal memory stage.

4. The combination defined in claim 3, further comprising an end-of-message detector connected to said first storage means and working into said logic network for generating said termination code also in response to a special bit combination registered by said processor in a section of a principal memory stage.

5. The combination defined in claim 3 wherein said multiplexing means is provided with a first input connected to said second storage means and with a second input connected to said logic network, said second input being energizable with an overriding resetting signal from said logic network upon a second appearance of a synchronizing signal in any of said second outputs for temporarily deactivating said switch means during changeover from one signal track to another in the readout of data codes from a given principal memory stage.

6. The combination defined in claim 2 wherein said closed loop has a branch including a repetition controller responsive to a predetermined combination of bits from said second storage means and from said logic network for iteratively reading out the contents of a loaded principal memory stage.

7. The combination defined in claim 2, further comprising switchover means controlled by said timing means for establishing in each time slot a first period enabling said first storage means to be addressed via said synchronously operative circuitry, for the readout of a data code from any loaded principal memory stage, and a second period enabling said first storage means to be addressed via said asynchronously operative circuitry, to select an unloaded principal memory stage for loading with a data code.

8. The combination defined in claim 7, further comprising bistable means responsive to a stop signal from said logic network for generating in said asynchronous circuitry a clearing signal, effective in said second period, for unloading a heretofore loaded principal memory stage.

9. The combination defined in claim 1, further comprising a driving circuit for the activation of said dynamic memory, said driving circuit including counting means connected to said first storage means for ascertaining the presence of a data code in at least one of said *m* principal memory stages during a scanning cycle and deactivating said dynamic memory in the absence thereof.

10. The combination defined in claim 1 wherein said dynamic memory is provided with filter means connected to said first outputs for separating said synchronizing signal from said message words, said second outputs originating at said filter means.

* * * * *